US009108869B2

(12) United States Patent
Mazumdar et al.

(10) Patent No.: US 9,108,869 B2
(45) Date of Patent: Aug. 18, 2015

(54) PH ADJUSTMENT WITHIN GASIFICATION SYSTEM

(75) Inventors: Anindra Mazumdar, Katy, TX (US); James Scott Kain, Houston, TX (US)

(73) Assignee: General Electric Company, Schenectady, NY (US)

( * ) Notice: Subject to any disclaimer, the term of this patent is extended or adjusted under 35 U.S.C. 154(b) by 465 days.

(21) Appl. No.: 13/589,865

(22) Filed: Aug. 20, 2012

(65) Prior Publication Data

US 2014/0047975 A1    Feb. 20, 2014

(51) Int. Cl.
| *B01D 53/14* | (2006.01) |
| *B01D 53/02* | (2006.01) |
| *C02F 1/66* | (2006.01) |
| *C10J 3/72* | (2006.01) |
| *C10K 1/00* | (2006.01) |
| *C10K 1/10* | (2006.01) |
| *C10K 3/04* | (2006.01) |
| *C02F 103/00* | (2006.01) |

(52) U.S. Cl.
CPC . *C02F 1/66* (2013.01); *C10J 3/723* (2013.01); *C02F 2103/002* (2013.01); *C02F 2209/06* (2013.01); *C10J 2300/0959* (2013.01); *C10J 2300/0969* (2013.01); *C10J 2300/169* (2013.01); *C10J 2300/1815* (2013.01); *C10K 1/005* (2013.01); *C10K 1/10* (2013.01); *C10K 3/04* (2013.01); *Y02E 20/18* (2013.01); *Y02E 20/185* (2013.01)

(58) Field of Classification Search
CPC combination set(s) only.
See application file for complete search history.

(56) References Cited

U.S. PATENT DOCUMENTS

| 4,437,417 | A | * | 3/1984 | Roberts | 588/320 |
| 4,500,324 | A | * | 2/1985 | Vuong | 48/197 R |
| 4,854,942 | A |   | 8/1989 | Denney et al. |  |
| 5,108,929 | A | * | 4/1992 | Segura et al. | 436/55 |
| 5,487,835 | A |   | 1/1996 | Shane |  |
| 5,514,264 | A |   | 5/1996 | Shane |  |
| 6,036,748 | A | * | 3/2000 | Wallace et al. | 95/257 |
| 6,620,091 | B1 | * | 9/2003 | Zavell et al. | 588/250 |
| 6,723,756 | B2 | * | 4/2004 | Munson et al. | 518/700 |
| 2006/0112639 | A1 | * | 6/2006 | Nick et al. | 48/198.1 |
| 2008/0006587 | A1 |   | 1/2008 | Cumming et al. |  |
| 2010/0089740 | A1 | * | 4/2010 | Vuong et al. | 203/10 |

FOREIGN PATENT DOCUMENTS

| DE | 102010026172 A1 | 1/2012 |
| WO | 9102964 A1 | 3/1991 |

OTHER PUBLICATIONS

PCT Search Report and Written Opinion dated Oct. 17, 2013 from Application No. PCT/US2013/052472.

* cited by examiner

*Primary Examiner* — Kaity Handal
(74) *Attorney, Agent, or Firm* — Fletcher Yoder, P.C.

(57) ABSTRACT

A gasification system includes a water source, a downstream system configured to receive a first stream having water from the water source, and a carbon a carbon dioxide injector configured to adjust a pH of the water using a second stream having carbon dioxide to form pH-adjusted water.

15 Claims, 3 Drawing Sheets

PH ADJUSTMENT WITHIN GASIFICATION SYSTEM

BACKGROUND OF THE INVENTION

The subject matter disclosed herein relates to pH adjustment, and more particularly, to systems and methods for pH adjustment within gasification systems.

Gasification systems convert carbonaceous materials into a hot mixture of carbon monoxide and hydrogen, referred to as synthesis gas or syngas. Upon gasification, the resulting syngas may include less desirable components, such as ash or soot. The syngas is directed through a quench chamber, which cools the syngas using water and removes the less desirable components as a slag. Thereafter, the ash and soot may be separated from the slag. Recovered water and solids (e.g., unconverted carbon) may be recycled back to the gasifier. Unfortunately, the blowdown or purge of some water is required to control dissolved salts to minimize material corrosion. This water may be may be unsuitable for discharge or reuse, and thus downstream treatment systems (e.g., grey water blowdown treatment systems), such as heat exchanger systems, microbial systems, and the like may be desirable. The grey water blowdown treatment systems may require one or more steps of pH adjustment

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gasification system includes a water source, a downstream system configured to receive a first stream having water from the water source, and a carbon dioxide injector configured to adjust a pH of the water using a second stream having carbon dioxide to form pH-adjusted water.

In a second embodiment, a method includes producing a first stream having carbon dioxide within a carbon dioxide source of a gasification system. The method also includes adjusting a pH of a second stream having water using the carbon dioxide from the first stream.

In a third embodiment, a gasification system includes a carbon dioxide source, a carbon dioxide injector, and a downstream system. The carbon dioxide source is configured to produce a first stream having carbon dioxide from an inlet stream having syngas. The carbon dioxide injector is configured to inject the first stream into a second stream having water to adjust a pH of the second stream. The downstream system is configured to receive the second stream.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to pH adjustment within gasification systems. In particular, carbon dioxide ($CO_2$) is injected into one or more streams having water, which adjusts the pH of the one or more streams. That is, the $CO_2$ dissolves into the water to form carbonic acid or bicarbonate, which generally decreases the pH of the water. The carbon dioxide may be produced within the gasification system itself, such as by a pressure swing adsorption unit or an acid gas removal unit. This may reduce the reliance of the gasification system on external supplies of carbon dioxide. Gasification systems may include strongly basic streams (e.g., pH greater than 10). Typically, strong mineral acids, such as sulfuric acid, are used for pH reduction or neutralization. However, it is now recognized that carbon dioxide is capable of reducing the pH of strongly basic streams, even through carbon acid and bicarbonate are relatively weak acids. Advantageously, carbonic acid forms a buffer solution with water, thereby stabilizing the pH of the water. The usage of carbon dioxide for pH adjustment increases the efficiency of the gasification system and reduces the usage of strong mineral acids within the gasification system.

Figure 1:
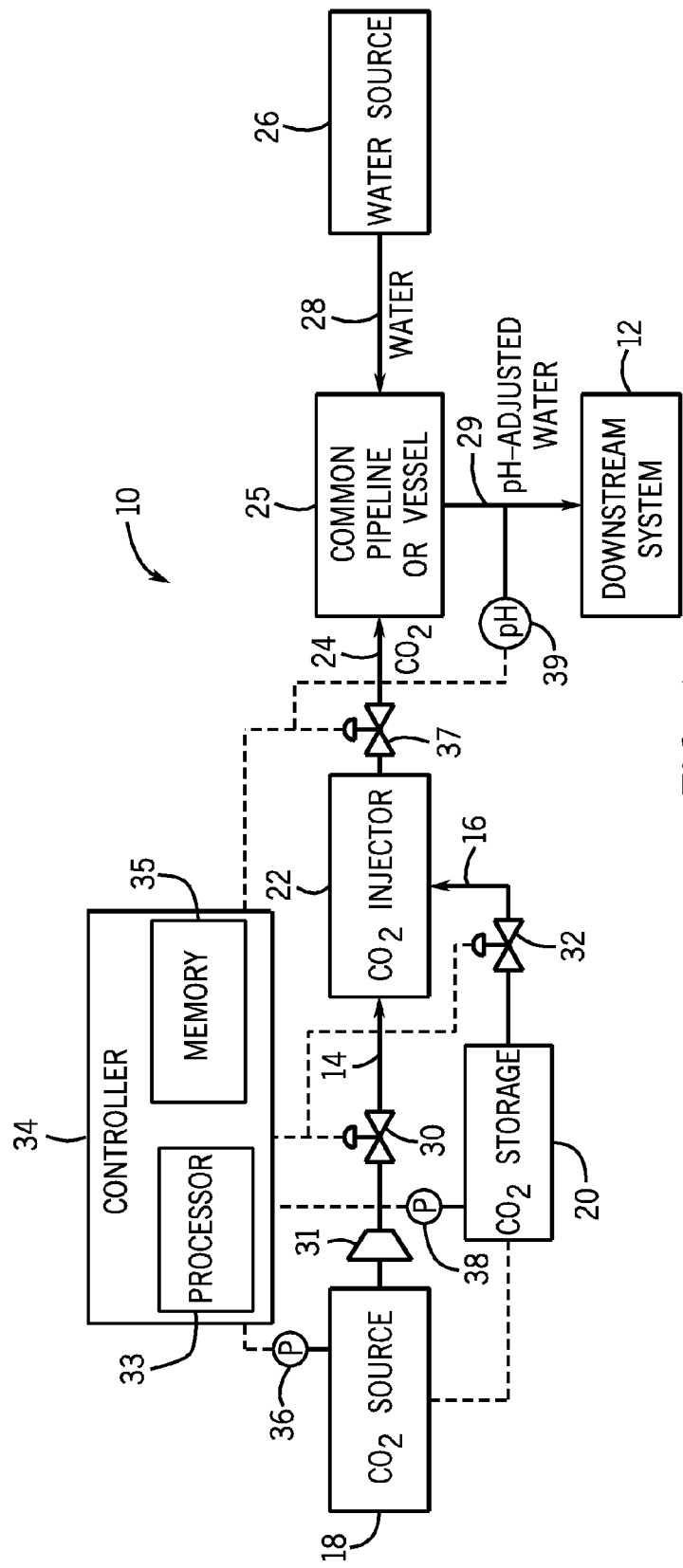
FIG. 1 is a schematic diagram of an embodiment of a pH adjustment system, illustrating a carbon dioxide source coupled to a downstream system.

Turning now to the figures, FIG. 1 illustrates a pH adjustment system 10 that is used to adjust (e.g., decrease) a pH of a water stream for a downstream system 12. The downstream system 12 may be any system for which pH-adjusted water is desirable, such as chemical reactors, heat exchangers, recarbonation after softening, filters, microbial systems, and the like. The pH-adjusted water generally improves the efficiency and operability of the downstream system 12. An embodiment of the downstream system 12 is discussed in further detail below.

As noted above, carbon dioxide may be advantageously used as the pH adjusting agent to reduce the usage of strong mineral acids. A stream containing carbon dioxide (e.g., stream 14 or 16) is supplied from a carbon dioxide source 18 or carbon dioxide storage 20. The carbon dioxide source 18 may be any system or vessel that produces carbon dioxide, such as an acid gas removal (AGR) unit or a pressure swing adsorption (PSA) unit of a gasification system. The carbon dioxide storage 20 may be any vessel that may be used to store the carbon dioxide for an extended period of time, such as a storage tank. The carbon dioxide may be stored as a gas, liquid, solid, or any combination thereof. Storing the carbon dioxide as a liquid advantageously decreases the size of the carbon dioxide storage 20. A carbon dioxide injector 22 receives the carbon dioxide stream and injects a carbon dioxide stream 24 into a common pipeline or vessel 25. As illustrated, the carbon dioxide stream 24 may include carbon dioxide from the $CO_2$ source 18 and/or the $CO_2$ storage 20. Accordingly, the carbon dioxide stream 24 may include carbon dioxide as a gas, liquid, or a combination thereof. Within the common pipeline or vessel 25, the carbon dioxide stream 24 mixes with a water stream 28 from a water source 26, thereby forming pH-adjusted water 29. Thereafter, the pH-adjusted water 29 is directed to the downstream system 12.

Figure 2:
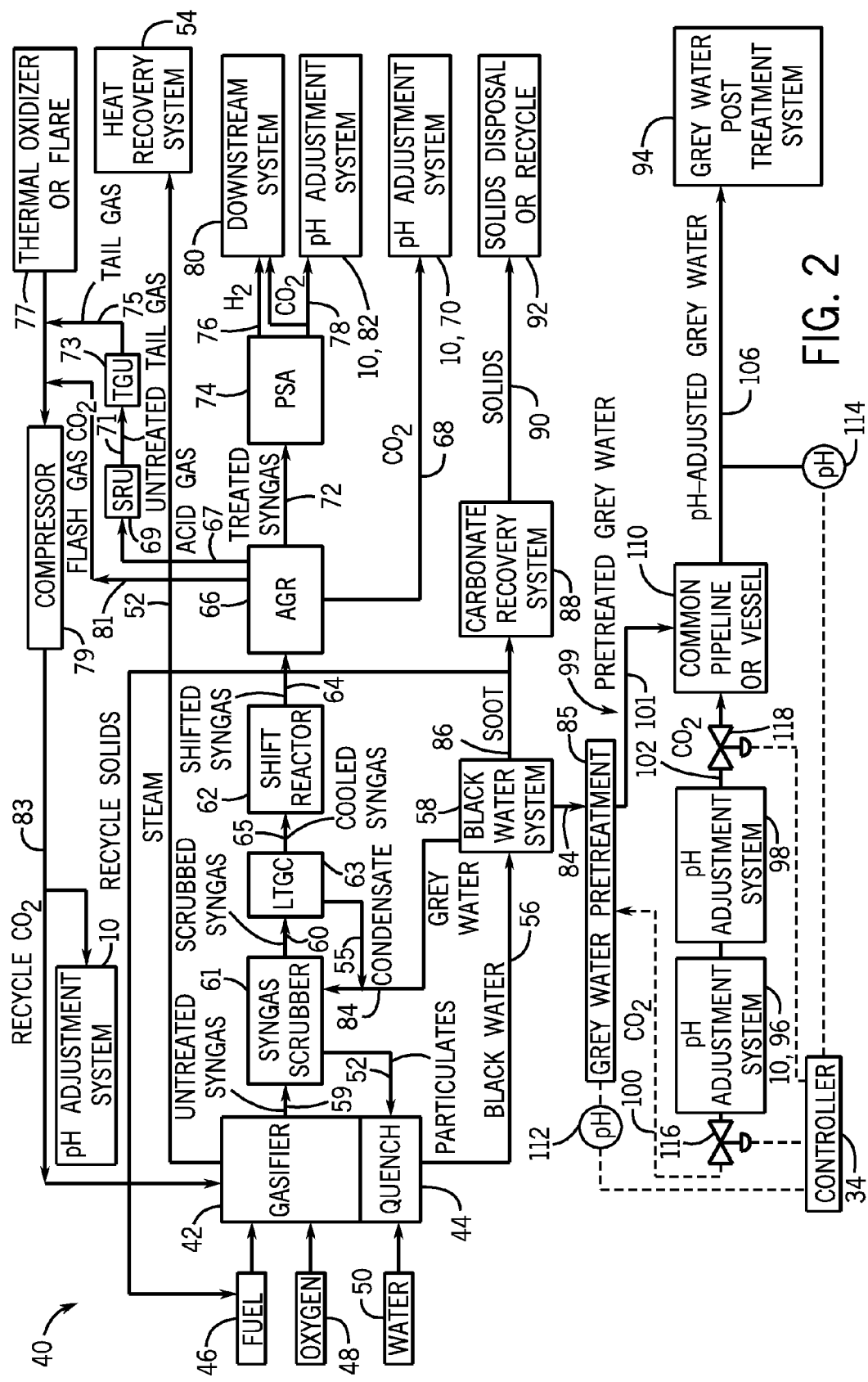
FIG. 2 is a schematic diagram of an embodiment of a gasification system having the pH adjustment system of FIG. 1.

Depending on the carbon dioxide source 18, the carbon dioxide stream 24 may contain other components in addition to carbon dioxide, such as hydrocarbons, nitrogen, and the like. For example, the carbon dioxide source may be a PSA unit (e.g., PSA 74 as shown in FIG. 2), and the carbon dioxide stream 14 may include hydrogen. Accordingly, the carbon dioxide stream 24 may include impurities (e.g., gases, liquids, or solids) but may nevertheless be used to adjust the pH of the water stream 28. Therefore, the usage of utilities and equipment typically associated with removing the impurities is reduced. In certain embodiments, the carbon dioxide stream 14 may intentionally include other components (e.g., nitrogen) as a conveyance material for the carbon dioxide. For example, the stream 14 may be saturated or concentrated solution of carbonic acid and water. However, it may also be desirable to directly inject the carbon dioxide stream 14 into the downstream system 12 without using the water stream 28. The downstream systems 12 may include covered tanks, vessels, or reactors depending upon available detention time, flow path configurations (upward or downward and mixing regimes), desired efficiency of reactions, potential emissions concerns, and final water post treatment or disposal.

In addition, the carbon dioxide source 18 (e.g., PSA unit or AGR unit) may operate at a greater pressure than the downstream system 12. As a result, the carbon dioxide stream 24 may be used as the pH-adjusting agent without the use of additional pumps or compressors to pressurize the carbon dioxide stream 14, thereby reducing the operating cost of the pH adjustment system 10. However, in certain embodiments, the carbon dioxide source 18 may operate at a lower pressure than the downstream system 12. A compressor 31 may be disposed between the carbon dioxide source 18 and the carbon dioxide injector to increase the pressure of the carbon dioxide stream 14 to a suitable level for the downstream system 12.

Similarly, the water stream 28 may contain components in addition to water, such as ammonia, dissolved salts, and the like. These components may affect the pH of the water stream 28. Thus, in certain embodiments, the water stream 28 may be a basic solution, and the carbon dioxide stream 24 may reduce the pH of the water stream 28. In other embodiments, the water stream 28 may have a neutral pH, and the carbon dioxide stream 24 may acidify the water stream 28 for the downstream system 12.

As shown, control valves 30 and 32 are disposed along flow paths of the respective streams 14 and 16. The control valves 30 and 32 may selectively block, adjust, and/or enable flow from the carbon dioxide source 18 and the carbon dioxide storage 20 to the carbon dioxide injector 22. For example, during start-up of a gasification system, the carbon dioxide source 18 may not be operational. The carbon dioxide storage 20 may be used to supply the carbon dioxide until the carbon dioxide source 18 begins producing carbon dioxide (e.g., after a time delay). Accordingly, the control valve 30 may be closed and the control valve 32 may be opened, thereby enabling flow from the carbon dioxide storage 20 while blocking flow from the carbon dioxide source 18. A controller 34 is communicatively coupled to the carbon dioxide source 18 and the carbon dioxide storage 20 and their respective pressure sensors 36 and 38. As shown, the controller 34 includes a processor 33 and memory 35 to execute instructions to control the pH of the water 29. These instructions may be encoded in software programs that may be executed by the processor 33. Further, the instructions may be stored in a tangible, non-transitory, computer-readable medium, such as the memory 35. The memory 35 may include, for example, random-access memory, read-only memory, rewritable memory, hard drives, and the like.

The controller 34 may execute instructions to control the control valves 30 and 32 based on the pressures detected by the pressure sensors 36 and 38. In certain embodiments, the sensors 36 and 38 may be any transducer that provides feedback of any suitable operating condition of the $CO_2$ source 18 and the $CO_2$ storage 20, such as temperature, pressures, flow rates, levels, $CO_2$ concentrations, and the like. For example, a low pressure reading by the pressure sensor 36 may indicate that the carbon dioxide source 18 is not operational. In response, the controller 34 may execute instructions to close the control valve 30.

The controller 34 is also communicatively coupled to a control valve 37 disposed along a flow path of the carbon dioxide stream 24. The control valve 37 adjusts the flow of the carbon dioxide stream 24 to the common pipeline or vessel 25, and therefore can be used to affect the pH of the pH-adjusted water 29. The controller 34 is communicatively coupled to the control valve 37 and a pH sensor 39 disposed along the flow path of the pH-adjusted water 29. Accordingly, the controller 34 may execute instructions to adjust the control valve 37 based at least on the pH detected by the pH sensor 39. For example, if the pH of the pH-adjusted water 29 is too low, the controller 34 may execute instructions to further open the control valve 37. This controlled valve opening increases the carbon dioxide injection rate into the common pipeline or vessel 25, thereby decreasing the pH of the pH-adjusted water 29.

The pH adjustment system 10 may be used in a variety of systems, such as a gasification system 40 as illustrated in FIG. 2. In certain embodiments, the gasification system 40 may be an integrated gasification combined cycle (IGCC) that produces electrical power using syngas, or a gasification polygen system that is used to produce feed streams for chemical production. As shown, the gasification system 40 includes a gasifier 42 equipped with a quench chamber 44. The gasifier 42 receives fuel 46 (e.g., coal, biomass, or another carbonaceous feedstock) and oxygen 48, which react to form syngas and certain reaction byproducts, such as ash and soot. The syngas flows into the quench chamber 44, where water 50 cools the syngas and absorbs the soot from the syngas. In some gasifier/syngas quench or cooler-quench configurations, steam 52 may be produced and exported for let-down. The steam 52 may also be directed to a heat recovery system 54 (e.g., a heat recovery steam generator). The heat recovery system 54 increases the efficiency of the gasification system 40 by extracting work from the steam 52. Another portion of the water 50 exits the gasifier 42 along with the removed ash and soot (e.g., slag), referred to as black water 56. The black water 56 is directed toward a black water system 58, which will be discussed further below. Untreated syngas 59 exits the gasifier 42 and enters a syngas scrubber 61. The syngas scrubber 61 removes undesirable particulates 57 from the untreated syngas. The particulates 57 are returned to the gasifier 42 to exit along with the black water 56. Scrubbed syngas 60, relatively cleaned of ash and soot, exits the syngas scrubber 61 and enters a low temperature gas cooling (LTGC) train 63. The LTGC 63 train may include a feed/product heat exchanger to cool the shifted syngas 64. In addition, a condensate 55 from the LTGC may be mixed with grey water 84 from the black water system 58 and returned to the syngas scrubber 61. Cooled syngas 65 exits the LTGC 63 and flows to a shift reactor 62.

In certain embodiments, it is desirable to increase a hydrogen content of the cooled syngas 65 using the shift reactor 62. Within the shift reactor 62, a syngas shift reaction occurs, whereby carbon monoxide and water react to form carbon dioxide and hydrogen. Thereafter, shifted syngas 64, which may contain relatively little carbon monoxide, exits the shift reactor 62 and undergoes absorption treatment by a suitable solvent in an acid gas removal (AGR) system 66. As shown, flash gas 81 (e.g., $CO_2$) and acid gas 67 are removed from the cooled syngas 65. The acid gas 67 is routed to a sulfur recovery unit (SRU) 69. The SRU 69 may be designed based on the Claus process or similar technology. The acid gas 67 (e.g., ammonia acid gas) are fed to a multi-chamber reaction furnace of the SRU. The acid gas 67 is fed to a burner within the first chamber of the furnace. Within the furnace, the acid gas 67 is combusted with oxygen, which may be supplied from a combination of ambient air from an air blower and low pressure oxygen from an air separation unit (ASU). A series of condensers and reheaters within the SRU 69 allow sulfur to be formed from the reaction of $H_2S$ and $SO_2$ over a fixed bed of catalyst. Untreated tail gas 71 from the SRU 69 flows to a tail gas unit (TGU) 73, which reacts unconverted sulfur into hydrogen sulfide ($H_2S$) for recycling back to the gasifier 42. Treated syngas 72 from the AGR 66 may be the source of reducing gas to convert any residual sulfur into hydrogen sulfide. Tail gas 75 from the TGU 73, which contains carbon dioxide, is routed to a thermal oxidizer 77 (e.g., flare) or a compressor 79 for recycling to the gasifier 42. Different modifications of the SRU 69 design or tail gas treatment are possible, which still allow a stream containing carbon dioxide to be recycled or reused. For example, the flash gas 81 from the AGR 66 and the tail gas 75 recycled from the TGU 73 may be compressed by the $CO_2$ recycle compressors 79 and recycled back to the gasifier 42 as a recycle $CO_2$ stream 83.

The AGR unit 66 removes certain impurities, such as acid gases (e.g., hydrogen sulfide), from the shifted syngas 64. As shown, the AGR unit 66, which may include a carbon capture system, also separates a carbon dioxide stream 68 from the shifted syngas 64. The carbon dioxide stream 68 may include other components in small quantity, such as hydrogen sulfide, hydrogen, and the like. Advantageously, even an impure stream of carbon dioxide (e.g., 68) may be used for pH adjustment. As shown, the carbon dioxide stream 68 is directed to a pH adjustment system 70 (e.g., pH adjustment system 10 of FIG. 1) as the pH adjusting agent. In other words, the AGR unit 66 (or carbon capture system) may be the carbon dioxide source 18 (FIG. 1) of the pH adjustment system 70.

After impurities within the shifted syngas 64 are reduced, treated syngas 72 exits the AGR unit 66 and flows into a pressure swing adsorption (PSA) unit 74. The PSA unit 74 separates the treated syngas 72 into a hydrogen stream 76 and a carbon dioxide stream 78. As illustrated, the hydrogen stream 76 is routed to a downstream system 80, which may include a power generation plant, a chemical reactor, and the like. The carbon dioxide stream 78 may be split, with a portion directed to a pH adjustment system 82 (e.g., pH adjustment system 10 of FIG. 1). That is, the PSA unit 74 may be the carbon dioxide source 18 of the pH adjustment system 82. Notably, the carbon dioxide stream 78 from the PSA unit 74 contains relatively few impurities (e.g., less than 1 percent impurities by volume, or less than 10000 parts per million by volume). Thus, in embodiments where a relatively pure stream of $CO_2$ is desired, it may be desirable to use the carbon dioxide stream 78 as the pH adjusting agent within the pH adjustment system 82. Certain embodiments may selectively use the carbon dioxide streams 68, 78, and 83 for pH adjustment based on their respective impurity levels. For example, the PSA unit 74 may startup after the AGR unit 66. The carbon dioxide stream 68 from the AGR unit 66 may be used for pH adjustment until the PSA unit 74 becomes operational, at which point the carbon dioxide stream 78 is used for pH adjustment due to the higher purity of the carbon dioxide produced by the PSA unit 74. Thus, the controller 34 of FIG. 1 may include instructions to select between the carbon dioxide streams 68 and 78 depending on the operating mode (e.g., start-up mode or steady-state) of the components of the gasification system 40.

It should be noted that certain embodiments may not include the AGR unit 66 or the PSA unit 74, and may contain additional or alternative sources of carbon dioxide (e.g., absorbers, adsorber beds, cryogenic systems, ceramic-based systems, membranes, microbial, and/or algal systems). Accordingly, the pH adjustment systems 70 and 82 may receive carbon dioxide streams from a variety of different sources. In addition, each of the adjustment systems 70 and 82 may receive carbon dioxide streams from multiple sources.

As noted earlier, the black water 56 from the quench chamber 44 flows to the black water system 58, which separates the black water 56 into grey water 84 and soot 86. The soot 86 is recycled to the gasifier 42 with the fuel feed stream 46. However, the soot 86 may be directed to a carbon recovery system 88, which dewaters or extracts the soot and other solids 90 for solids recycle or disposal at a downstream system (e.g., solids disposal or recycle system 92). As will be appreciated, recycled soot containing carbon may increase the efficiency or the yield of the syngas production within the gasifier 42. The black water system water purge stream (e.g., the grey water 84) flows to a grey water pretreatment system 85 which can include various water treatment methodologies.

After grey water pretreatment, the pretreated grey water 101 may flow to a grey water post treatment system 94. Additionally or alternatively, the pretreated grey water 101 may return to the syngas scrubber 61 and subsequently the quench chamber 44. Recovering grey water 84 from the black water 56 and then recycling the grey water 84 to the syngas scrubber 61 and quench chamber 44 advantageously decreases the water consumption of the gasification system 40.

In the illustrated embodiment, a pH adjustment system 96 (e.g., pH adjustment system 10 of FIG. 1) is coupled to the grey water pretreatment system 85 to adjust a pH of the grey water 84. In certain embodiments, desired pH conditions within the grey water pretreatment system 85 could be between approximately 8 and 12. The pH adjustment system 96 injects a carbon dioxide 100 (e.g., carbon dioxide stream 24 of FIG. 1) into the grey water 84 (e.g., water stream 28 of FIG. 1), thereby forming the pretreated grey water 101 (e.g., pH-adjusted water 29 of FIG. 1). The pretreated grey water 101 is then routed to the downstream systems (e.g., the grey water post treatment system 94, which might include additional physical-chemical treatment, direct biological treatment, deep well injection, or discharge to a publicly owned treatment works).

In a similar manner, a pH adjustment system 98 is disposed along the flow path 99 of the pretreated grey water 101. The pH adjustment system injects a carbon dioxide stream to adjust a pH of the pretreated grey water 101. Thus, the pH of the grey water 84 may be adjusted at multiple locations within the gasification system 40 (e.g., within the grey water pretreatment system 85 or at other points along the flow path 99). This allows pH adjustment of grey water to be done in one step or several steps, as may be beneficial due to the buffering capacity of the grey water, the shape of the grey water titration curve, as well as to allow control of potential scaling issues.

The pH adjustment system 98 injects the carbon dioxide stream 102 directly into the grey water 84 via a common pipeline or vessel 110 (e.g., common pipeline or vessel 25 of FIG. 1). However, in certain embodiments, it may be desirable to introduce a buffer between the carbon dioxide stream 102 and the grey water 84 or other process water streams. For example, the carbon dioxide stream 102 may be injected into low carbonate alkalinity high pH water, thereby forming a buffer (e.g., neutral to moderately alkaline water). This water, with additional CO2 may then mix with the pretreated grey water 101 within the common pipelines or vessel 110. Using multiple CO2 addition points may improve the uniformity of the pH within the pH-adjusted grey water 106, which may be desirable for the downstream systems, particularly for microbial and/or algal systems. In particular, multiple points of CO2 addition provide greater control over the pH of the grey water 106 and allows control of scaling within the upstream grey water pretreatment operations. The pH-adjusted grey water 106 may then be routed to various downstream systems, such as deep well injection systems. It should be noted that for deep well injection systems, the pH-adjusted grey water 106 may undergo further pH adjustment using strong mineral acids (e.g., hydrochloric acid, sulfuric acid, etc.). The selection of the mineral acid may be based on the chemistry of the reservoir rock. For example, in reservoirs with high calcium content, it may be desirable to use hydrochloric acid, as chlorides are highly soluble in water and do not form precipitates with calcium. Thus, in certain embodiments, the grey water 84 may undergo pH adjustment in multiple stages, and the pH adjusting agent may vary between stages (e.g., between $CO_2$ and a mineral acid).

pH sensors 112 and 114 (e.g., pH sensor 39 of FIG. 1) are disposed along the flow paths of pretreated grey water 101 (internal to the gasification system 40) and the pH-adjusted grey water 106. In addition, control valves 116 and 118 (e.g., control valve 37 of FIG. 1) are disposed along the flow paths of the carbon dioxide addition streams 100 and 102 for grey water treatment. The controller 34 is communicatively coupled to the pH sensors 112 and 114 and the control valves 116 and 118. The controller 34 may execute instructions to adjust respective flow rates of the carbon dioxide streams 100 and 102 to adjust the pH of the pretreated grey water 101 and/or the pH-adjusted grey water 106 based at least on the pH detected by the pH sensors 112 and 114. As will be appreciated, the downstream grey water post treatment system 94 may have different ranges of suitable pH levels. For example, a suitable pH level for deep well injection may be between approximately 4 and 7, whereas a suitable pH level for the grey water biological treatment system may be between approximately 7 and 8.5. Accordingly, the controller 34 may execute instructions to adjust the control valves 116 and 118 independently of each other to maintain suitable pH levels for each downstream system. The control loops will regulate CO2 flows, pressures, and alarms through variable measurement, comparison with a set point, and control action by a control valve/actuator. Control set points may be fixed or altered with respect to a parameter. Completely automatic operation of the loops will be the standard. Dedicated single-stream analyzers would be provided for all control applications. These would be continuous, online analyzers and would be interfaced in the same manner as other process variable transmitters within gasification.

Although the pH sensor 114 is positioned to measure the pH of the pH-adjusted water 106, it should be noted that the system may also include pH sensors for measuring the pH of the pretreated grey water 101 before carbon dioxide injection. Thus, the controller 34 may execute instructions to adjust the control valve 118 in response to the pH of the pretreated grey water 101. Such a configuration enables the controller 34 to respond more rapidly to changes in upstream conditions, as compared to pH detection downstream of the carbon dioxide injection. For example, if the fuel 46 changes, the pH of the grey water 84 may change. The pH sensors 114 may quickly detect the change in pH, enabling the controller 34 to execute instructions to adjust the flow rates of the carbon dioxide streams (100 and 102 accordingly). Safety interlocks would be applied as required to prevent personnel, environmental, or public hazard. To alert the operator to an alarm condition, alarms could be annunciated through a PLC or DCS alarm manager's graphical interface, which can be displayed on any operator workstation.

Figure 3:
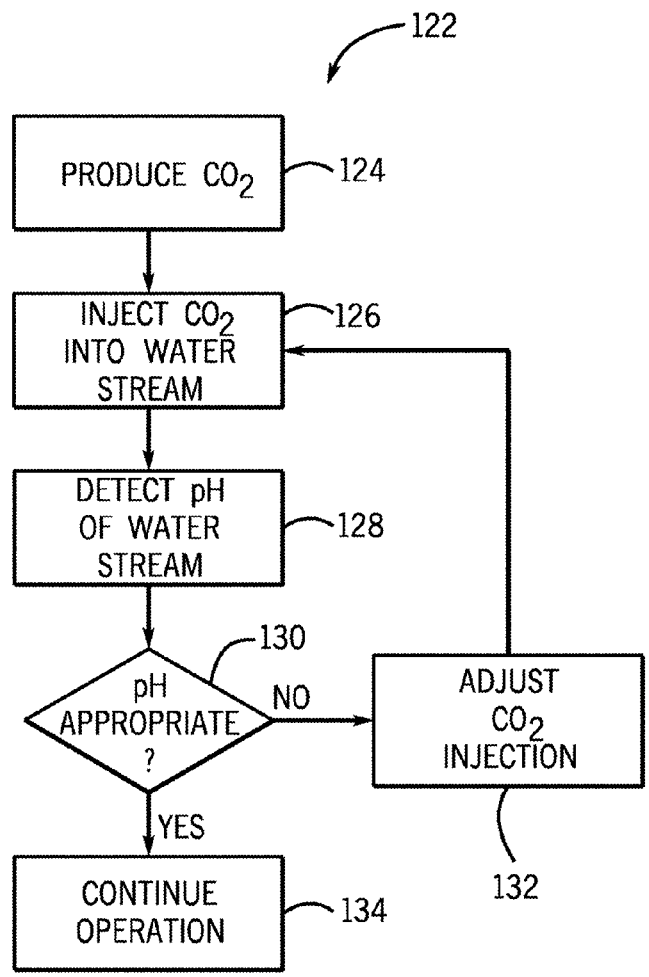
FIG. 3 is a flowchart of an embodiment of a method to adjust a pH for a downstream system using carbon dioxide.

FIG. 3 is a flowchart depicting an embodiment of a method 122 to adjust the pH of the water streams 28 within the gasification system 40. The method may be performed by the controller 34 of the pH adjustment system 10. Thus, each step of the method 122 may include execution of instructions disposed on a machine-readable medium, such as the memory 35 of the controller 34. The carbon dioxide source 18 produces (block 124) the carbon dioxide stream 14. As discussed above, in certain embodiments, the carbon dioxide source 18 may be the AGR unit 66, the PSA unit 74, or both. The carbon dioxide injector 22 injects (block 126) the carbon dioxide into the water stream 28, forming the pH-adjusted water 29. The pH sensor 39 detects (block 128) the pH of the pH-adjusted water 29. The controller 34 may then determine (block 130) if the pH is appropriate for the downstream system 12. If the pH is not appropriate, the controller 34 may adjust (block 132) the carbon dioxide injection rate by adjusting the control valve 37. However, when the pH is appropriate, the gasification system may continue (block 134) to operate, and the controller 34 may maintain the position of the control valve 37.

Technical effects of the disclosed embodiments include pH adjustment within gasification systems. Gasification systems may include strongly basic streams (e.g., pH greater than 10). Typically, strong mineral acids, such as sulfuric acid, are used for pH reduction or neutralization. However, it is now recognized that carbon dioxide is capable of reducing the pH of strongly basic streams, even through carbon acid and bicarbonate are relatively weak acids. Advantageously, carbonic acid forms a buffer solution with water, thereby stabilizing the pH of the water. The carbon dioxide may be produced within the gasification system itself, thereby reducing the reliance of the gasification system on external supplies of carbon dioxide. The usage of carbon dioxide for pH adjustment increases the efficiency of the gasification system and reduces the usage of strong mineral acids within the gasification system. The use of CO2 may allow pH adjustment in a single step or multiple steps, as desired for precise process control.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gasification system, comprising:
    a gasifier configured to convert a fuel and oxygen into syngas, wherein the gasifier comprises a quench chamber configured to reduce impurities within the syngas using water to produce black water;
    a black water system configured to receive the black water from the quench chamber and to generate grey water and soot; and
    a carbon dioxide injector fluidly coupled to a carbon dioxide source and configured to adjust a pH of at least a portion of the grey water by injecting carbon dioxide into the grey water.

2. The system of claim 1, wherein the carbon dioxide injector is configured to adjust the pH of the grey water by injecting the carbon dioxide directly into the grey water.

3. The system of claim 1, wherein the carbon dioxide injector is configured to adjust the pH of the grey water by injecting the carbon dioxide into injection water to form acidified water, and the carbon dioxide injector is configured to inject the acidified water into the grey water.

4. The system of claim 1, comprising:
    a pH sensor configured to measure the pH of the grey water;
    a control valve configured to adjust a flow of the carbon dioxide from the carbon dioxide source and to the carbon dioxide injector; and
    a controller communicatively coupled to the pH sensor and the control valve, wherein the controller is configured to adjust the control valve based on the pH of the grey water.

5. The system of claim 1, wherein the carbon dioxide source comprises an acid gas removal (AGR) unit of the gasification system, or a pressure swing adsorption (PSA) unit of the gasification system, or both.

6. The system of claim 1, comprising a compressor configured to compress the carbon dioxide upstream of the carbon dioxide injector.

7. A method, comprising:
    converting a fuel and oxygen into syngas with a gasifier of a gasification system, the gasifier comprising a quench chamber;
    reducing impurities within the syngas using water and the quench chamber to produce black water;
    generating grey water and soot from the black water using a black water treatment system;
    producing a first stream comprising carbon dioxide within a carbon dioxide source of the gasification system; and
    adjusting a pH of the grey water using a carbon dioxide injector to inject at least a portion of the first stream into the grey water.

8. The method of claim 7, wherein the carbon dioxide source comprises an acid gas removal (AGR) unit of the gasification system, or a pressure swing adsorption (PSA) unit of the gasification system, or both.

9. The method of claim 7, comprising storing a portion of the first stream within a carbon dioxide storage system, and after a time delay, injecting the portion of the first stream into the grey water using the carbon dioxide injector.

10. The method of claim 7, wherein adjusting the pH of the second stream comprises:
    detecting the pH of the grey water using a pH sensor; and
    controlling an injection rate of the first stream into the grey water based on the pH of the grey water or a pH threshold of a downstream system.

11. A gasification system, comprising:
    a gasifier comprising a quench chamber;
    a carbon dioxide source configured to produce a first stream comprising carbon dioxide from an inlet stream comprising syngas;
    a carbon dioxide injector configured to inject the first stream into a second stream comprising water generated as a byproduct from quenching the syngas within the quench chamber of the gasifier to decrease a pH of the second stream; and
    a downstream system configured to receive the second stream.

12. The system of claim 11, wherein the carbon dioxide source comprises an acid gas removal (AGR) unit, or a pressure swing adsorption (PSA) unit, or both.

13. The system of claim 12, wherein the downstream system comprises grey water pretreatment, or a grey water post treatment system, or both.

14. The system of claim 11, comprising a compressor disposed between the carbon dioxide source and the carbon dioxide injector, wherein the compressor is configured to increase a pressure of the first stream.

15. The system of claim 11, comprising:
    a pH sensor configured to measure the pH of the second stream;
    a control valve configured to adjust a flow rate of the first stream to the carbon dioxide injector; and
    a controller communicatively coupled to the pH sensor and the control valve, wherein the controller is configured to adjust the control valve based on the pH of the second stream and a pH threshold of the downstream system.

* * * * *